United States Patent
Shin et al.

(10) Patent No.: US 11,799,114 B2
(45) Date of Patent: Oct. 24, 2023

(54) SHEET LAMINATE FOR SOLID OXIDE FUEL CELL, PRECURSOR FOR SOLID OXIDE FUEL CELL, APPARATUS FOR MANUFACTURING SHEET LAMINATE FOR SOLID OXIDE FUEL CELL, AND METHOD FOR MANUFACTURING SHEET LAMINATE FOR SOLID OXIDE FUEL CELL

(71) Applicant: LG CHEM, LTD., Seoul (KR)

(72) Inventors: Dong Oh Shin, Daejeon (KR); Jongjin Lee, Daejeon (KR); Takkeun Oh, Daejeon (KR); Kwangwook Choi, Daejeon (KR); Jeong Mi Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 313 days.

(21) Appl. No.: 17/408,008

(22) Filed: Aug. 20, 2021

(65) Prior Publication Data

US 2021/0384542 A1    Dec. 9, 2021

Related U.S. Application Data

(62) Division of application No. 15/572,007, filed as application No. PCT/KR2016/006158 on Jun. 10, 2016, now Pat. No. 11,127,965.

(30) Foreign Application Priority Data

Jun. 11, 2015   (KR) .......................... 10-2015-0082728

(51) Int. Cl.
*H01M 8/1213*   (2016.01)
*H01M 4/88*   (2006.01)
(Continued)

(52) U.S. Cl.
CPC ....... *H01M 8/1213* (2013.01); *H01M 4/0471* (2013.01); *H01M 4/86* (2013.01);
(Continued)

(58) Field of Classification Search
CPC ............................. H01M 4/0471; H01M 4/88
See application file for complete search history.

(56) References Cited

U.S. PATENT DOCUMENTS

| 5,531,019 A | 7/1996 | Taira et al. |
| 2005/0271919 A1 | 12/2005 | Hata et al. |

(Continued)

FOREIGN PATENT DOCUMENTS

| CN | 103183513 A | 7/2013 |
| CN | 103928693 A | 7/2014 |

(Continued)

OTHER PUBLICATIONS

Extended European Search Report, dated Nov. 6, 2018, for European Application No. 16807833.5.
(Continued)

*Primary Examiner* — Sadie White
(74) *Attorney, Agent, or Firm* — Birch, Stewart, Kolasch & Birch, LLP

(57) ABSTRACT

The present specification relates to a sheet laminate for a solid oxide fuel cell, a precursor for a solid oxide fuel cell including the same, an apparatus for manufacturing a sheet laminate for a solid oxide fuel cell, and a method for manufacturing a sheet laminate for a solid oxide fuel cell.

7 Claims, 1 Drawing Sheet

(51) Int. Cl.
*H01M 8/124* (2016.01)
*H01M 4/86* (2006.01)
*H01M 4/04* (2006.01)
*H01M 8/1253* (2016.01)
*H01M 8/126* (2016.01)

(52) U.S. Cl.
CPC ............ *H01M 4/88* (2013.01); *H01M 8/124* (2013.01); *H01M 8/126* (2013.01); *H01M 8/1253* (2013.01); *Y02E 60/50* (2013.01); *Y02P 70/50* (2015.11)

(56) References Cited

U.S. PATENT DOCUMENTS

| | | |
|---|---|---|
| 2007/0180689 A1 | 8/2007 | Day et al. |
| 2008/0182154 A1 | 7/2008 | Kim et al. |
| 2011/0114254 A1 | 5/2011 | Xu et al. |
| 2013/0316264 A1 | 11/2013 | Liu et al. |
| 2015/0004526 A1 | 1/2015 | Kim et al. |

FOREIGN PATENT DOCUMENTS

| | | |
|---|---|---|
| CN | 105047973 A | 11/2015 |
| EP | 1492178 A2 | 12/2004 |
| EP | 1930974 A3 | 6/2008 |
| JP | 2009-54411 A | 3/2009 |
| JP | 2009-181891 A | 8/2009 |
| JP | 2014-116320 A | 6/2014 |
| KR | 10-2003-0045324 A | 6/2003 |
| KR | 10-2012-0040384 A | 4/2012 |
| KR | 10-1274809 B1 | 6/2013 |

OTHER PUBLICATIONS

International Search Report issued in PCT/KR2016/006158 (PCT/ISA/210), dated Aug. 24, 2016.

Shen, et al., "Co-sintering anode and Y2O3 stabilized ZnO2 thin electrolyte film for solid oxide fuel cell fabricated by co-tape casting," International Journal of Hydrogen Energy, vol. 37, 2012, pp. 10337-10345.

"Eastman EastaPure™ electronic chemicals: n-Butyl acetate" Eastman Chemical Company, 2008, 4 pages.

[Figure 1]
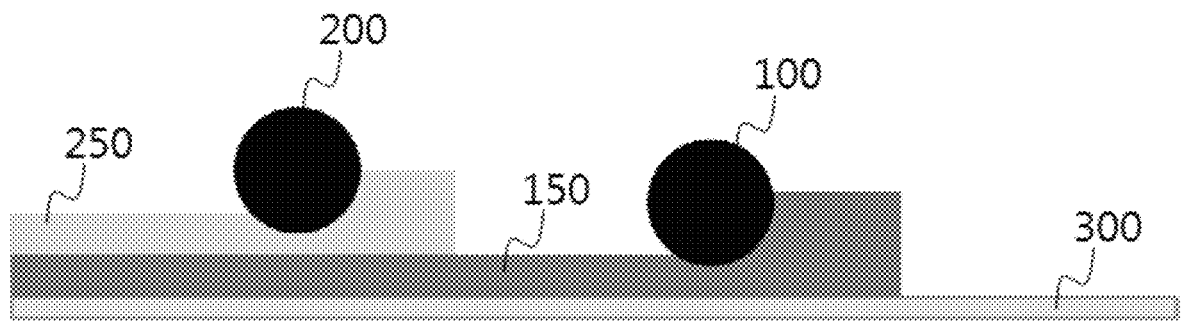
[Figure 2]
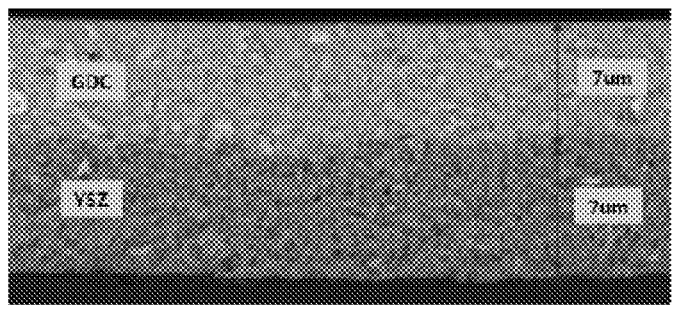

SHEET LAMINATE FOR SOLID OXIDE FUEL CELL, PRECURSOR FOR SOLID OXIDE FUEL CELL, APPARATUS FOR MANUFACTURING SHEET LAMINATE FOR SOLID OXIDE FUEL CELL, AND METHOD FOR MANUFACTURING SHEET LAMINATE FOR SOLID OXIDE FUEL CELL

CROSS-REFERENCE TO RELATED APPLICATIONS

This application is a Divisional of copending application Ser. No. 15/572,007, filed on Nov. 6, 2017, which is the National Phase under 35 U.S.C. § 371 of International Application No. PCT/KR2016/006158, filed on Jun. 10, 2016, which claims the benefit under 35 U.S.C. § 119(a) to Patent Application No. 10-2015-0082728, filed in Republic of Korea on Jun. 11, 2015, all of which are hereby expressly incorporated by reference into the present application.

TECHNICAL FIELD

The present specification relates to a sheet laminate for a solid oxide fuel cell, a precursor for a solid oxide fuel cell comprising the same, an apparatus for manufacturing a sheet laminate for a solid oxide fuel cell, and a method for manufacturing a sheet laminate for a solid oxide fuel cell.

BACKGROUND ART

Recently, depletion of existing energy sources such as oil and coal has been predicted, and interest in energy that can replace the energy is increasing. A fuel cell as one of the alternative energy has particularly received attention due to high efficiency and merits such that pollutants such as NOx and SOx are not discharged and the used fuel is abundant.

The fuel cell is a power generation system that converts chemical reaction energy of the fuel and an oxidizer into electric energy, and hydrogen and hydrocarbons such as methanol and butane as the fuel and oxygen as the oxidizer are representatively used.

In the fuel cell, there are a proton exchange membrane fuel cell (PEMFC), a direct methanol fuel cell (DMFC), a phosphoric acid fuel cell (PAFC), an alkaline fuel cell (AFC), a molten carbonate fuel cell (MCFC), a solid oxide fuel cell (SPFC), and the like.

DETAILED DESCRIPTION OF THE INVENTION

Technical Problem

The present specification has been made in an effort to provide a sheet laminate for a solid oxide fuel cell, a precursor for a solid oxide fuel cell including the same, an apparatus for manufacturing a sheet laminate for a solid oxide fuel cell, and a method for manufacturing a sheet laminate for a solid oxide fuel cell.

Technical Solution

An exemplary embodiment of the present specification provides a sheet laminate for a solid oxide fuel cell including two or more sheets containing solid oxides and solvents, in which the sheet laminate includes a first sheet containing a first solid oxide and a first solvent and a second sheet provided on the first sheet and containing a second solid oxide and a second solvent and the specific gravity of the first solvent is higher than the specific gravity of the second solvent.

Another exemplary embodiment of the present specification provides a precursor for a solid oxide fuel cell in which an anode, a solid electrolyte membrane, and a cathode are sequentially provided, in which at least one of the anode, the solid electrolyte membrane, and the cathode includes the sheet laminate.

Yet another exemplary embodiment of the present specification provides an apparatus for manufacturing a sheet laminate for a solid oxide fuel cell including: a coated member supplying unit; a sheet laminate collecting unit; and two or more coaters that coat a coating composition containing a solid oxide and a solvent on the surface of a coated member proceeding from the coated member supplying unit to the sheet laminate collecting unit to form a sheet laminate on the coated member, in which the two or more coaters include a first coater that supplies a coating composition containing a first solid oxide and a first solvent to form a first sheet and a second coater that supplies a coating composition containing a second solid oxide and a second solvent to form a second sheet on the first sheet, and the specific gravity of the first solvent is higher than the specific gravity of the second solvent.

Still another exemplary embodiment of the present specification provides a method for manufacturing a sheet laminate for a solid oxide fuel cell including forming two or more sheets on a coated member by coating a coating composition containing a solid oxide and a solvent to manufacture a sheet laminate, in which the forming of the two or more sheets includes forming a first sheet containing a first solid oxide and a first solvent and forming a second sheet provided on the first sheet and containing a second solid oxide and a second solvent, and the specific gravity of the first solvent is higher than the specific gravity of the second solvent.

Advantageous Effects

According to the method for manufacturing the sheet laminate for the solid oxide fuel cell of the present specification, it is possible to shorten a process as compared with a repeating process of sintering after single-layer coating.

Further, it is possible to prevent occurrence of bubbles between interfaces, which may occur in a process of laminating a multilayer sheet.

Further, it is possible to prevent defects caused by foreign materials between interfaces, which may occur in a process of laminating a multilayer sheet.

BRIEF DESCRIPTION OF DRAWINGS

FIG. 1 illustrates a coating process of a first coater and a second coater of an apparatus for manufacturing a sheet laminate for a solid oxide fuel cell according to an exemplary embodiment of the present specification.

FIG. 2 is a scanning electron microscopic (SEM) image for cross sections of a first sheet and a second sheet of Example 1 of the present specification.

EXPLANATION OF REFERENCE NUMERALS AND SYMBOLS

Best Mode

Hereinafter, exemplary embodiments of the present specification will be described in detail.

The present specification provides a sheet laminate for a solid oxide fuel cell including two or more sheets containing solid oxides and solvents, in which the sheet laminate includes a first sheet containing a first solid oxide and a first solvent and a second sheet provided on the first sheet and containing a second solid oxide and a second solvent and the specific gravity of the first solvent is higher than the specific gravity of the second solvent.

The sheet laminate for the solid oxide fuel cell of the present specification includes two or more sheets containing solid oxides and solvents. Particularly, the sheet laminate may be formed by laminating two or more sheets containing solid oxides and solvents, respectively.

The sheet laminate may be formed by laminating two or more sheets and particularly, the sheet laminate may be formed by laminating two to four sheets.

The two or more sheets may include a first sheet containing a first solid oxide and a first solvent and a second sheet provided on the first sheet and containing a second solid oxide and a second solvent.

The two or more sheets may further include a third sheet provided on the second sheet and containing a third solid oxide and a third solvent. Particularly, the two or more sheets may include a first sheet containing a first solid oxide and a first solvent; a second sheet provided on the first sheet and containing a second solid oxide and a second solvent; and a third sheet provided on the second sheet and containing a third solid oxide and a third solvent.

The two or more sheets may further include a fourth sheet provided on the third sheet and containing a fourth solid oxide and a fourth solvent. Particularly, the two or more sheets may include a first sheet containing a first solid oxide and a first solvent; a second sheet provided on the first sheet and containing a second solid oxide and a second solvent; a third sheet provided on the second sheet and containing a third solid oxide and a third solvent; and a fourth sheet provided on the third sheet and containing a fourth solid oxide and a fourth solvent.

The two or more sheets may be green sheets for a solid oxide fuel cell in which two or more sheets are laminated for manufacturing the solid oxide fuel cell in which an anode, a solid electrolyte membrane, and a cathode are sequentially included. Particularly, the two or more sheets may be a green sheet laminate of an anode and a solid electrolyte membrane; a green sheet laminate in which an anode, a solid electrolyte membrane, and a cathode are sequentially included; a green sheet laminate of two or more anodes; a green sheet laminate of two or more solid electrolyte membranes; or a green sheet laminate of two or more cathodes.

The green sheet means a film-like membrane which may be processed in a next process other than a complete end product.

In the present specification, the green sheet is coated with a coating composition containing the solid oxide and the solvent to be dried in a sheet form and means a semi-dried sheet capable of maintaining a sheet form while including some solvent.

A thickness of any one sheet of the two or more sheets may have various thicknesses depending on a process step and/or a thickness of a desired individual sheet. Particularly, the thickness of any one sheet of the two or more sheets may be adjusted depending on a coating film which is coated with the coating composition containing the solid oxide and the solvent and not dried, a green sheet of which some of the solvent is removed through a drying process, an electrode or an electrolyte membrane in which two or more relatively thin layers are laminated, a thick film electrode formed by a relatively thick film, or the like. If necessary, the thickness of any one sheet of the two or more sheets may be 1 μm or more and 1,000 μm or less.

When any one sheet of the two or more sheets is an individual sheet for manufacturing the green sheet of the electrolyte membrane, the thickness of the coating film before drying may be 5 μm or more and 1,000 μm or less.

When any one sheet of the two or more sheets is an individual sheet for manufacturing the green sheet of the electrolyte membrane, the thickness of the green sheet of the electrolyte membrane after drying may be 1 μm or more and 800 μm or less.

When any one sheet of the two or more sheets is an individual sheet for manufacturing the green sheet of the anode, the thickness of the coating film before drying may be 100 μm or more and 1,000 μm or less.

When any one sheet of the two or more sheets is an individual sheet for manufacturing the green sheet of the anode, the thickness of the green sheet of the anode after drying may be 100 μm or more and 1,000 μm or less.

When any one sheet of the two or more sheets is an individual sheet for manufacturing the green sheet of the cathode, the thickness of the coating film before drying may be 100 μm or more and 1,000 μm or less.

When any one sheet of the two or more sheets is an individual sheet for manufacturing the green sheet of the cathode, the thickness of the green sheet of the cathode after drying may be 100 μm or more and 1,000 μm or less.

Each of the two or more sheets contains the solid oxide and the solvent. Particularly, the individual sheets of the two or more sheets individually include the same or different solid oxides and solvents.

In the sheet laminate according to the exemplary embodiment of the present specification, the specific gravity of the solvent contained in a sheet relatively close to the ground may be higher than the specific gravity of the solvent contained in a sheet relatively farther from the ground. In other words, the sheet relatively close to the ground means a relatively first manufactured sheet and the sheet relatively farther from the ground means a relatively later manufactured sheet. In this case, there is an advantage in that the components of the adjacent sheets are not mixed.

In the sheet laminate according to the exemplary embodiment of the present specification, the specific gravity of the first solvent contained in the first sheet may be higher than the specific gravity of the second solvent contained in the second sheet provided on the first sheet. In this case, there is an advantage in that the components of the first sheet and the second sheet are not mixed.

In the sheet laminate according to the exemplary embodiment of the present specification, the specific gravity of the first solvent contained in the first sheet may be higher than the specific gravity of the second solvent contained in the second sheet provided to contact the first sheet. In this case, there is an advantage in that the components of the first sheet and the second sheet are not mixed.

The solvent contained in the individual sheet of the two or more sheets may be a single solvent or a mixed solvent in which two or more solvents are mixed. In this case, when the solvent contained in the individual sheet is the mixed solvent, the specific gravity of the solvent contained in the individual sheet means the specific gravity of the entire mixed solvent.

If the solvent is selected so that the specific gravity of the solvent contained in the sheet relatively close to the ground is higher than the specific gravity of the solvent contained in the sheet relatively farther from the ground, a type of solvent is not particularly limited, and the solvent may use a solvent which is generally used in the art.

For example, the solvent may include at least one of toluene (specific gravity: 0.867), propylene glycol monomethyl ether acetate (PGMEA) (specific gravity: 0.996), ethanol (specific gravity: 0.7893), methyl ethyl ketone (MEK) (specific gravity: 0.805), and propylene glycol monomethyl ether (PGME) (specific gravity: 0.862).

A difference in the specific gravity between the solvent contained in a sheet relatively close to the ground and the solvent contained in a sheet provided to contact the sheet and relatively farther from the ground may be 0.05 or more and 0.3 or less. In this case, there is an advantage in that the solvents contained in different sheets are mixed.

In the sheet laminate according to the exemplary embodiment of the present specification, a difference in the specific gravity between the first solvent contained in the first sheet and the second solvent contained in the second sheet provided on the first sheet may be 0.05 or more and 0.3 or less. In this case, there is an advantage in that the solvents contained in different sheets are mixed.

In the sheet laminate according to the exemplary embodiment of the present specification, a difference in the specific gravity between the first solvent contained in the first sheet and the second solvent contained in the second sheet provided to contact the first sheet may be 0.05 or more and 0.3 or less. In this case, there is an advantage in that the solvents contained in the sheets contacting each other are not mixed.

Based on the total weight of the first sheet, the content of the first solvent may be 30 wt % or less.

Based on the total weight of the second sheet, the content of the second solvent may be 30 wt % or less.

When the two or more sheets, including a first sheet containing a first solid oxide and a first solvent and a second sheet provided on the first sheet and containing a second solid oxide and a second solvent, further include a third sheet provided on the second sheet and containing a third solid oxide and a third solvent, the specific gravity of the second solvent may be higher than the specific gravity of the third solvent. Particularly, a difference in the specific gravity between the first solvent and the second solvent may be 0.05 or more and 0.3 or less and a difference in the specific gravity between the second solvent and the third solvent may be 0.05 or more and 0.3 or less.

When the two or more sheets, including a first sheet containing a first solid oxide and a first solvent, a second sheet provided on the first sheet and containing a second solid oxide and a second solvent and a third sheet provided on the second sheet and containing a third solid oxide and a third solvent, further include a fourth sheet provided on the third sheet and containing a fourth solid oxide and a fourth solvent, the specific gravity of the third solvent may be higher than the specific gravity of the fourth solvent. Particularly, a difference in the specific gravity between the first solvent and the second solvent may be 0.05 or more and 0.3 or less, a difference in the specific gravity between the second solvent and the third solvent may be 0.05 or more and 0.3 or less, and a difference in the specific gravity between the third solvent and the fourth solvent may be 0.05 or more and 0.3 or less.

In the present specification, the specific gravity means a ratio of the weight of water and the weight of a measuring material in the same volume as the water, and represents that a material with the specific gravity of 1.00 or less is lighter than the water and a material with the specific gravity of 1.00 or more is heavier than the water.

A constituent material of the solid oxide is not particularly limited as long as the solid oxide is included in the anode, the solid electrolyte membrane, and the cathode of the solid oxide fuel cell according to a purpose.

The solid oxide may be two or more oxides selected from transition metals. Particularly, the solid oxide may be two or more oxides selected from rare earth, a titanium group and a lanthanum group in the periodic table.

If at least one sheet of the two or more sheets is the sheet for the anode of the solid oxide fuel cell, the solid oxide included in the sheet for the anode may include at least one of yttria stabilized zirconia oxide (YSZ: $(Y_2O_3)_x(ZrO_2)_{1-x}$=0.05 to 0.15), scandinavian stabilized zirconium oxide (ScSZ: $(Sc_2O_3)_x(ZrO_2)_{1-x}$=0.05 to 0.15)), samarium doped ceria (SDC: $(Sm_2O_3)_x(CeO_2)_{1-x}$=0.02 to 0.4), and gadolinium doped ceria (GDC: $(Gd_2O_3)_x(CeO_2)_{1-x}$=0.02 to 0.4).

If at least one sheet of the two or more sheets is the sheet for the solid electrolyte membrane of the solid oxide fuel cell, the solid oxide included in the sheet for the solid electrolyte membrane may include at least one of yttria stabilized zirconia oxide (YSZ: $(Y_2O_3)_x(ZrO_2)_{1-x}$=0.05 to 0.15), scandinavian stabilized zirconium oxide (ScSZ: $(Sc_2O_3)_x(ZrO_2)_{1-x}$, x=0.05 to 0.15)), samarium doped ceria (SDC: $(Sm_2O_3)_x(CeO_2)_{1-x}$, x=0.02 to 0.4), and gadolinium doped ceria (GDC: $(Gd_2O_3)_x(CeO_2)_{1-x}$, x=0.02 to 0.4).

If the two or more sheets are the sheets for the cathode of the solid oxide fuel cell, the solid oxide included in the sheets for the cathode may include at least one of lanthanum strontium cobalt ferrite (LSCF) and lanthanum strontium manganate (LSM).

The two or more sheets may further include plasticizers except for the solid oxides and the solvents. The kind of plasticizer is not particularly limited and plasticizers generally used in the art may be adopted, and for example, and the plasticizer may be dibutyl phthalate (DBP).

The present specification provides a precursor for a solid oxide fuel cell in which an anode, a solid electrolyte membrane, and a cathode are sequentially provided, in which at least one of the anode, the solid electrolyte membrane, and the cathode includes the sheet laminate.

In the present specification, the precursor for the solid oxide fuel cell means a state before the solid oxide fuel cell is completely manufactured, and particularly, a state in which the solid oxide fuel cell in which the anode, the solid electrolyte membrane, and the cathode are sequentially provided can be formed through a sintering process. In other words, the precursor for the solid oxide fuel cell of the present specification includes one or more layers in which the solvent is not completely removed and means a state in which the solid oxide fuel cell in which the anode, the solid electrolyte membrane, and the cathode are sequentially provided can be formed through a sintering process.

In the precursor for the solid oxide fuel cell, the solid electrolyte membrane includes two or more solid electrolyte membranes and the two or more solid electrolyte membranes may include the sheet laminate.

In the precursor for the solid oxide fuel cell, the anode and the solid electrolyte membrane provided on the anode may include the sheet laminate.

In the precursor for the solid oxide fuel cell, when the solid electrolyte membrane includes two or more solid electrolyte membranes, the anode and the two or more solid electrolyte membranes provided on the anode may include the sheet laminate.

In the precursor for the solid oxide fuel cell, the anode, a solid electrolyte membrane provided on the anode, and a cathode provided on the solid electrolyte membrane may include the sheet laminate.

In the precursor for the solid oxide fuel cell, when the solid electrolyte membrane includes two or more solid electrolyte membranes, the anode, the two or more solid electrolyte membranes provided on the anode, and the cathode provided on the solid electrolyte membrane may include the sheet laminate.

The present specification provides a solid oxide fuel cell in which the precursor for the solid oxide fuel cell is sintered.

In the solid oxide fuel cell, an anode, a solid electrolyte membrane, and a cathode may be sequentially provided.

The present specification provides a cell module including the solid oxide fuel cell as a unit cell.

The cell module may include a stack including unit cells including the solid oxide fuel cell and a separator provided between the unit cells; a fuel supplying unit supplying the fuel to the stack; and an oxidizer supplying unit supplying an oxidizer to the stack.

The cell module may be particularly used as power of an electric vehicle, a hybrid electric vehicle, a plug-in hybrid electric vehicle or an electric power storage device.

The present specification provides an apparatus for manufacturing a sheet laminate for a solid oxide fuel cell including a coated member supplying unit, a sheet laminate collecting unit, and two or more coaters that coat a coating composition containing a solid oxide and a solvent on the surface of a coated member proceeding from the coated member supplying unit to the sheet laminate collecting unit to form a sheet laminate on the coated member, in which the two or more coaters include a first coater that supplies a coating composition containing a first solid oxide and a first solvent to form a first sheet and a second coater that supplies a coating composition containing a second solid oxide and a second solvent to form a second sheet on the first sheet, and the specific gravity of the first solvent is higher than the specific gravity of the second solvent.

In the apparatus for manufacturing the sheet laminate for the solid oxide fuel cell of the present specification, description for the same or similar configuration as or to the sheet laminate for the solid oxide fuel cell may cite those described above.

The two or more coaters may include a first coater that supplies a coating composition containing a first solid oxide and a first solvent to form a first sheet and a second coater that supplies a coating composition containing a second solid oxide and a second solvent to form a second sheet on the first sheet.

The two or more coaters may include a first coater that supplies a coating composition containing a first solid oxide and a first solvent to form a first sheet, a second coater that supplies a coating composition containing a second solid oxide and a second solvent to form a second sheet on the first sheet, and a third coater that supplies a coating composition containing a third solid oxide and a third solvent to form a third sheet on the second sheet.

The two or more coaters may include a first coater that supplies a coating composition containing a first solid oxide and a first solvent to form a first sheet, a second coater that supplies a coating composition containing a second solid oxide and a second solvent to form a second sheet on the first sheet, a third coater that supplies a coating composition containing a third solid oxide and a third solvent to form a third sheet on the second sheet, and a fourth coater that supplies a coating composition containing a fourth solid oxide and a fourth solvent to form a fourth sheet on the third sheet.

Each of the two or more coaters may include a supplying unit that supplies a coating composition containing a solid oxide and a solvent to form a sheet and a thickness adjusting portion that adjusts a thickness of the sheet.

The first coater may include a first supplying unit that supplies a coating composition containing a first solid oxide and a first solvent to form a first sheet and a first thickness adjusting portion that adjusts a thickness of the first sheet.

The second coater may include a second supplying unit that supplies a coating composition containing a second solid oxide and a second solvent to form a second sheet on the first sheet and a second thickness adjusting portion that adjusts a thickness of the second sheet.

The third coater may include a third supplying unit that supplies a coating composition containing a third solid oxide and a third solvent to form a third sheet on the second sheet and a third thickness adjusting portion that adjusts a thickness of the third sheet.

The fourth coater may include a fourth supplying unit that supplies a coating composition containing a fourth solid oxide and a fourth solvent to form a fourth sheet on the third sheet and a fourth thickness adjusting portion that adjusts a thickness of the fourth sheet.

The two or more coaters may be spaced apart from each other on one surface of the coated member.

The two or more coaters include any one coater and the other coater adjacent to any one coater and may be spaced apart from each other at a distance considering a process from one point where the coated member or the sheet laminate contacts any one coater to one point where the coated member or the sheet laminate contacts the other coater.

A material of the coated member is not particularly limited so long as the material supports the sheet laminate and is easily removed later, but may adopt a material which is generally used in the art.

The apparatus for manufacturing the sheet laminate for the solid oxide fuel cell of the present specification may further include a drying unit positioned between the two or more coaters and the sheet laminate collecting unit.

The drying unit may dry the sheet laminate in which the coating of the two or more sheets is completed.

The drying unit is a unit to maintain a shape of the sheet by partially removing each solvent contained in the individual sheet of the sheet laminate in which the coating of the two or more sheets is completed.

The content of the solvent contained in the individual sheet of the sheet laminate dried by the drying unit may be 0.1 wt % or more and 10 wt % or less based on the total weight of the solvent contained in the individual sheet before drying.

A temperature of the drying unit may be 60° C. or more and 90° C. or less.

The apparatus for manufacturing the sheet laminate for the solid oxide fuel cell of the present specification may further include a green sheet supplying unit; and a pressing roll that presses a green sheet and the dried sheet laminate so that the green sheet supplied from the green sheet supplying unit contacts the surface of the dried sheet laminate.

The apparatus for manufacturing the sheet laminate for the solid oxide fuel cell may include one or more sintering units.

The apparatus for manufacturing the sheet laminate for the solid oxide fuel cell of the present specification may further include a drying unit positioned between the two or more coaters and the sheet laminate collecting unit and a sintering unit positioned between the drying unit and the sheet laminate collecting unit.

The sintering unit may sinter the dried sheet laminate at once. In this case, the temperature of the sintering unit may be 1,000° C. or more and 1,500° C. or less.

When the apparatus for manufacturing the sheet laminate for the solid oxide fuel cell further includes a green sheet supplying unit; and a pressing roll that presses a green sheet and the dried sheet laminate so that the green sheet supplied from the green sheet supplying unit contacts the surface of the dried sheet laminate, the sintering unit may be positioned between the pressing roll and the sheet laminate collecting unit to sinter the dried sheet laminate and the green sheet together. In this case, the temperature of the sintering unit may be 1,000° C. or more and 1,500° C. or less.

When the apparatus for manufacturing the sheet laminate for the solid oxide fuel cell further includes a green sheet supplying unit; and a pressing roll that presses a green sheet and the dried sheet laminate so that the green sheet supplied from the green sheet supplying unit contacts the surface of the dried sheet laminate, the sintering unit may include a first sintering unit provided between the drying unit and the pressing roll and a second sintering unit provided between the pressing roll and the sheet laminate collecting unit.

The first sintering unit sinters the dried sheet laminate at once and the temperature of the first sintering unit may be 1,000° C. or more and 1,500° C. or less.

The second sintering unit sinters the green sheet provided on the sintered sheet laminate and in this case, the temperature of the second sintering unit may be 1,000° C. or more and 1,500° C. or less.

The apparatus for manufacturing the sheet laminate for the solid oxide fuel cell of the present specification may further include a coated member removing unit that removes the coated member from the dried sheet laminate or the sintered sheet laminate.

The coated member removing unit may be provided between the drying unit and the pressing roll. In this case, before the green sheet is laminated by the pressing roll, the coated member is removed and the green sheet may be laminated on at least one of a surface from which the coated member of the dried sheet laminate is removed and an opposite surface to the surface from which the coated member of the dried sheet laminate is removed.

The coated member removing unit may be provided between the first sintering unit and the pressing roll. In this case, before the green sheet is laminated by the pressing roll, the coated member is removed and the green sheet may be laminated on at least one of a surface from which the coated member of the sintered sheet laminate is removed and an opposite surface to the surface from which the coated member of the sintered sheet laminate is removed.

The coated member removing unit may be provided between the sintering unit and the sheet laminate collecting unit.

The present specification provides a method for manufacturing a sheet laminate for a solid oxide fuel cell including forming two or more sheets on a coated member by coating a coating composition containing a solid oxide and a solvent to manufacture a sheet laminate, in which the forming of the two or more sheets includes forming a first sheet containing a first solid oxide and a first solvent and forming a second sheet provided on the first sheet and containing a second solid oxide and a second solvent, and the specific gravity of the first solvent is higher than the specific gravity of the second solvent.

In the method for manufacturing the sheet laminate for the solid oxide fuel cell of the present specification, description for the same or similar configuration as or to the sheet laminate for the solid oxide fuel cell and the method for manufacturing the same may cite those described above.

The forming of the two or more sheets may include forming a first sheet containing a first solid oxide and a first solvent and forming a second sheet provided on the first sheet and containing a second solid oxide and a second solvent.

The forming of the two or more sheets may include forming a first sheet containing a first solid oxide and a first solvent; forming a second sheet provided on the first sheet and containing a second solid oxide and a second solvent; and forming a third sheet provided on the second sheet and containing a third solid oxide and a third solvent.

The forming of the two or more sheets may include forming a first sheet containing a first solid oxide and a first solvent; forming a second sheet provided on the first sheet and containing a second solid oxide and a second solvent; forming a third sheet provided on the second sheet and containing a third solid oxide and a third solvent; and forming a fourth sheet provided on the third sheet and containing a fourth solid oxide and a fourth solvent.

The method for manufacturing the sheet laminate for the solid oxide fuel cell of the present specification may further include drying the manufactured sheet laminate.

The method for manufacturing the sheet laminate for the solid oxide fuel cell of the present specification may further include sintering the dried sheet laminate.

The method for manufacturing the sheet laminate for the solid oxide fuel cell of the present specification may further include laminating the green sheet on the surface of the dried sheet laminate.

The method for manufacturing the sheet laminate for the solid oxide fuel cell of the present specification may further include removing the coated member before the laminating. In this case, in the laminated green sheet, the green sheet may be laminated on at least one of a surface from which the coated member of the dried sheet laminate is removed and an opposite surface to the surface from which the coated member of the dried sheet laminate is removed.

The method for manufacturing the sheet laminate for the solid oxide fuel cell of the present specification may further include laminating the green sheet on the surface of the dried sheet laminate and sintering the sheet laminate on which the green sheet is laminated.

The method for manufacturing the sheet laminate for the solid oxide fuel cell of the present specification may further include laminating the green sheet on the surface of the sintered sheet laminate; and sintering the green sheet.

The method for manufacturing the sheet laminate for the solid oxide fuel cell of the present specification may further include removing the coated member before the laminating. In this case, in the laminated green sheet, the green sheet may be laminated on at least one of a surface from which the coated member of the sintered sheet laminate is removed and an opposite surface to the surface from which the coated member of the sintered sheet laminate is removed.

In order to manufacture the solid oxide fuel cell, a process of making and laminating three types of layers of a cathode (an air electrode), an anode (a fuel electrode), and a solid electrolyte membrane is required.

Generally, the fuel electrode is manufactured by using a method such as pressing and then the solid electrolyte membrane and the air electrode are sequentially laminated on the fuel electrode by a method such as dip coating and screen printing. In this case, a subsequent film may be laminated only through a sintering process before each layer is laminated.

Meanwhile, the layers of the cathode, the solid electrolyte membrane and the anode may be respectively processed and laminated in a sheet form and simultaneously sintered. In this case, in the process of laminating each sheet, bubbles between the sheets occur or foreign materials are input between the sheets to cause defects.

The method for manufacturing the sheet laminate for the solid oxide fuel cell of the present specification is characterized by coating a multilayer at once without the drying process or the sintering process between the coating processes of the respective layers.

In the method for manufacturing the sheet laminate for the solid oxide fuel cell of the present specification, since the two or more coated layers are dried and sintered at once, it is possible to shorten a process as compared with a repeating process of sintering the coated single layer.

Further, it is possible to prevent occurrence of bubbles between interfaces, which may occur in a process of laminating a multilayer sheet.

Further, it is possible to prevent defects caused by foreign materials between interfaces, which may occur in a process of laminating a multilayer sheet.

Hereinafter, the present specification will be described in more detail through Examples. However, the following Examples are just to exemplify the present specification and the present specification is not limited thereto.

EXAMPLE

Example 1

On a substrate, a composition for a first sheet containing 6.2 g (50 wt %) of gadolinium doped ceria (GDC), 1.2 g (9.7 wt %) of DISPERBYK-112 as a dispersant, 0.1 g (0.8 wt %) of DBP as a plasticizer, 1.5 g (12.1 wt %) of SOKEN LRRS001 as a binder solution, and 3.4 g (PGMEA, 27.4 wt %) of propylene glycol monomethyl ether acetate as a solvent was coated by a first coater. In this case, a first sheet coated by the first coater was adjusted to 50 μm.

The first sheet was not dried, and then on the first sheet, a composition for a second sheet including 20 g (40 wt %) of yttria stabilized zirconium oxide (YSZ), 1.34 g (2.7 wt %) of BYK112 as a dispersant, 0.20 g (0.4 wt %) of DBP as a plasticizer, 5 g (10 wt %) of SOKEN LRRS001 as a binder solution, and 23.5 g (47 wt %) of toluene as a solvent was coated by using a second coater, and then a manufactured sheet laminate was dried at 70° C. for 5 minutes. In this case, the second sheet coated by the second coater was adjusted to 100 μm, and thicknesses of the first sheet and the second sheet of the dried sheet laminate were 7 μm like a SEM image illustrated in FIG. 2, respectively.

On the second sheet of the dried sheet laminate, an anode green sheet including yttria stabilized zirconium oxide with a thickness of 400 μm was laminated and then the sheet laminate was sintered together with the anode green sheet at 1350° C.

A printed member of the sintered sheet laminate was removed, a cathode green sheet containing lantanium strontium cobalt ferrite (LSCF) was laminated on a surface from which the printed member was removed, and then the cathode green sheet was sintered at 1,000° C. to manufacture a solid oxide fuel cell.

The invention claimed is:

1. An apparatus for manufacturing a sheet laminate for a solid oxide fuel cell, the apparatus comprising:
   a coated member supplying unit;
   a sheet laminate collecting unit; and
   two or more coaters that coat a coating composition containing a solid oxide and a solvent on the surface of a coated member proceeding from the coated member supplying unit to the sheet laminate collecting unit to form a sheet laminate on the coated member,
   wherein the two or more coaters include
   a first coater that supplies a coating composition containing a first solid oxide and a first solvent to form a first sheet and
   a second coater that supplies a coating composition containing a second solid oxide and a second solvent to form a second sheet on the first sheet, and
   the specific gravity of the first solvent is higher than the specific gravity of the second solvent, wherein the two or more coaters further include a third coater that supplies a coating composition containing a third solid oxide and a third solvent to form a third sheet on the second sheet, and
   the specific gravity of the second solvent is higher than the specific gravity of the third solvent,
   wherein the two or more coaters further include a fourth coater that supplies a coating composition containing a fourth solid oxide and a fourth solvent to form a fourth sheet on the third sheet, and
   the specific gravity of the third solvent is higher than the specific gravity of the fourth solvent.

2. The apparatus of claim 1, wherein the first coater includes a first supplying unit that supplies the coating composition containing the first solid oxide and the first solvent to form the first sheet and a first thickness adjusting portion that adjusts a thickness of the first sheet, and
   the second coater includes a second supplying unit that supplies the coating composition containing the second solid oxide and the second solvent to form the second sheet on the first sheet and a second thickness adjusting portion that adjusts a thickness of the second sheet.

3. The apparatus of claim 1, wherein the two or more coaters are spaced apart from each other on one surface of the coated member.

4. The apparatus of claim 1, wherein a difference in specific gravity between the first solvent and the second solvent is 0.05 or more and 0.3 or less.

5. The apparatus of claim 1, further comprising:
   a drying unit positioned between the two or more coaters and the sheet laminate collecting unit.

6. The apparatus of claim 5, further comprising:
   a green sheet supplying unit; and a pressing roll that presses the green sheet and the dried sheet laminate so that the green sheet supplied from the green sheet supplying unit contacts the surface of the dried sheet laminate.

7. The apparatus of claim 5, further comprising:
   a sintering unit positioned between the drying unit and the sheet laminate collecting unit.

* * * * *